(12) United States Patent
Mao

(10) Patent No.: US 8,964,412 B2
(45) Date of Patent: Feb. 24, 2015

(54) SPLIT CURRENT MIRROR LINE SENSING

(71) Applicant: Power Integrations, Inc., San Jose, CA (US)

(72) Inventor: Mingming Mao, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 170 days.

(21) Appl. No.: 13/665,173

(22) Filed: Oct. 31, 2012

(65) Prior Publication Data
US 2014/0119059 A1 May 1, 2014

(51) Int. Cl.
*H02M 3/335* (2006.01)
(52) U.S. Cl.
USPC ............ 363/16; 363/21.04; 363/21.05
(58) Field of Classification Search
USPC ................. 363/16, 21.04, 21.12
See application file for complete search history.

(56) References Cited

U.S. PATENT DOCUMENTS

| | | | | |
|---|---|---|---|---|
| 8,139,384 B2* | 3/2012 | Kung et al. | | 363/97 |
| 2006/0092675 A1* | 5/2006 | Kajita | | 363/39 |
| 2010/0321958 A1* | 12/2010 | Brinlee et al. | | 363/21.1 |
| 2013/0002360 A1* | 1/2013 | Kawamoto | | 331/34 |
| 2014/0062609 A1* | 3/2014 | Lee et al. | | 331/116 FE |

* cited by examiner

*Primary Examiner* — Emily P Pham
(74) *Attorney, Agent, or Firm* — Morrison & Foerster LLP

(57) ABSTRACT

Apparatus and methods for filtering the transients of an input signal of an integrated circuit while maintaining a constant voltage at an input terminal of the integrated circuit are disclosed. In one example, the integrated circuit can be a controller of a switched-mode power supply. The controller can include a line sensing circuit coupled to receive an input signal representative of the line voltage and operable produce an output signal that can be used by other circuits within the controller. The input signal may include a current through a sense resistor coupled between the input of the power supply and the line sensing circuit. The output signal may include a scaled and filtered version of this current. The line sensing circuit can be coupled to the input terminal of the controller to receive the input signal or can directly receive the input signal.

33 Claims, 3 Drawing Sheets

SPLIT CURRENT MIRROR LINE SENSING

BACKGROUND

1. Field

The present disclosure relates generally to power converters and, in particular but not exclusively, relates to filtering input signals of the power converter.

2. Description of Related Art

Many electronic devices, such as cell phones, laptop computers, etc., use direct current (dc) power to operate. Conventional wall outlets generally deliver a high voltage alternating current (ac) power that needs to be transformed to dc power in order to be used as a power source by most electronic devices. Switched mode power converters are commonly used due to their high efficiency, small size, and low weight to convert the high voltage ac power to a regulated dc power. In operation, a switch is used to provide a desired output by switching at a variable duty ratio (typically, the ratio of on-time of the switch to total switching period) or by varying the number of ON and OFF cycles of the switch per unit time.

A switched mode power converter may also employ a controller which typically provides output regulation by sensing the output and controlling the switch in a closed loop. The controller may receive a feedback signal representative of the output and then vary one of the control parameters (e.g., duty ratio or the number of ON and OFF cycles of the switch per unit time) in response to the feedback signal to regulate the output to a desired quantity.

An input voltage of a power converter, also referred to as a line voltage, is usually a rectified and filtered ac voltage and the average value of the line voltage does not typically vary over time. The line voltage may have transient portions where the voltage level spikes (that is, fluctuates significantly over a short time period) due to several factors, such as power outages, power transitions in the large equipment on the same power line, malfunctions caused by the power company, etc. These voltage spikes produce corresponding transients (potentially having a large magnitude) in the input current of the power supply.

A controller of a switched mode power converter may have a sense terminal to receive an input sense signal, which is representative of a line voltage, in the form of a current to use for a multitude of purposes. In one example, a controller can use the input sense signal to realize various fault detection features, such as line overvoltage/undervoltage detection. In another example, a controller can adjust one of the control parameters, such as switching frequency, in response to the input sense signal to reduce the switching loss in a power converter.

DESCRIPTION OF THE FIGURES

Non-limiting and non-exhaustive embodiments of the present invention are described with reference to the following figures, wherein like reference numerals refer to like parts throughout the various views unless otherwise specified.

DETAILED DESCRIPTION

Figure 1:
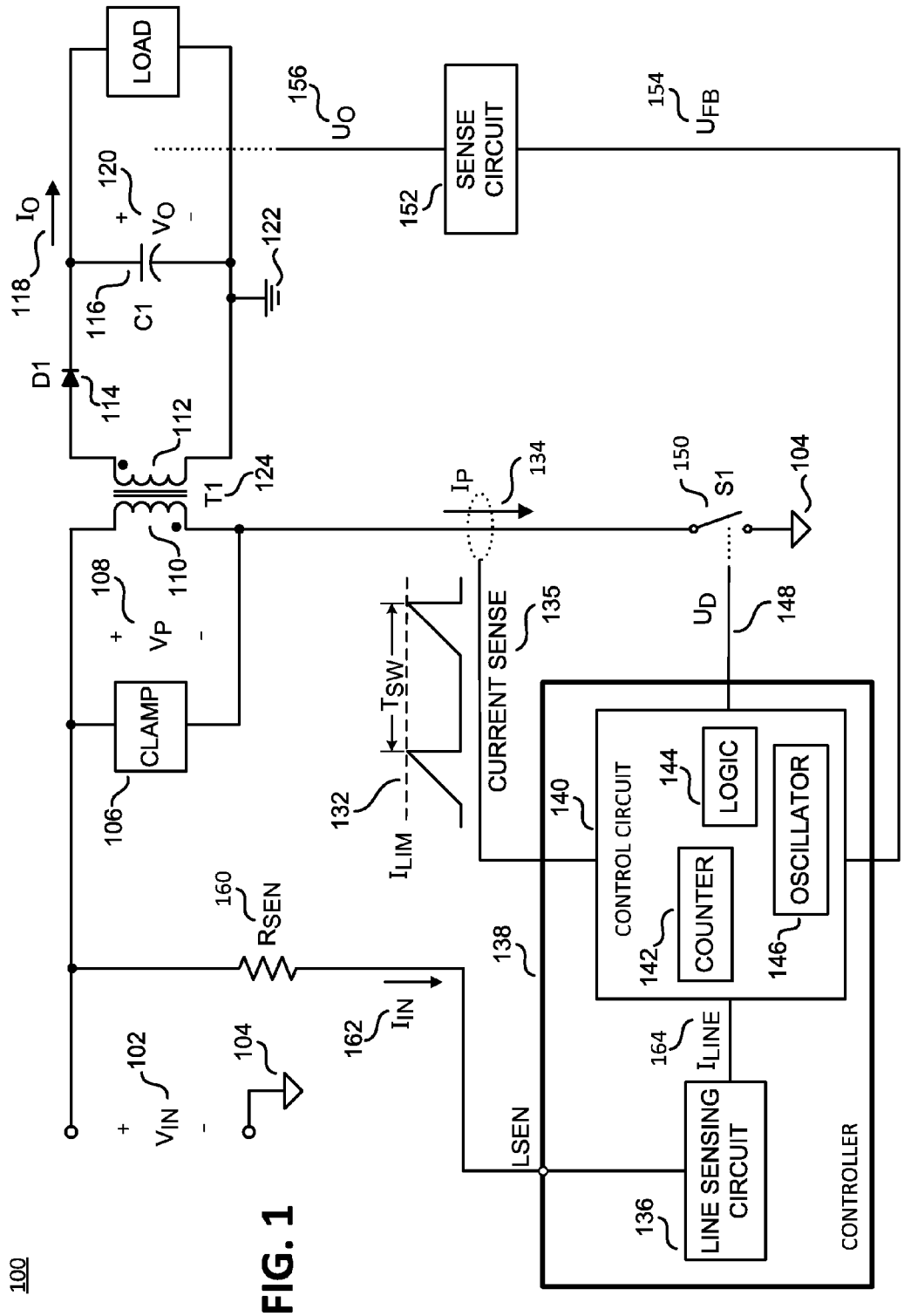
FIG. 1 is a schematic diagram illustrating an example power supply with a controller including a line sensing circuit in accordance with the teachings of the present disclosure.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As previously mentioned, the controller may include a sense terminal to receive the input sense signal representative of the input voltage of the switched mode power supply. For safe and reliable operation of the power supply, however, the controller may first filter the input sense signal because the transients in the input sense signal can potentially damage the circuits inside the controller that are sensitive to excessive current. In addition, the transients in the input sense signal can vary the voltage at the sense terminal of the controller and, in turn, can cause false triggers in the controller especially if the sense terminal is used for sensing multiple parameters of the power supply, such as input voltage, input current, etc. One approach to address these challenges is to use a clamp circuit that sets the voltage at the sense terminal to a fixed limit when the input sense signal exceeds a threshold, but this approach also has some disadvantages. For example, a clamp circuit usually includes various circuit components, such as diodes, capacitors, and resistors, and thus, requires extra space on the silicon die. Also, a clamp circuit typically needs to detect the existence of a certain event at its input, such as an input signal going above or below a threshold, before triggering an appropriate response, which can introduce additional delay that may cause the clamp circuit to miss a fast transient. Therefore, a new circuit that can filter the transients in an input sense signal and keep a constant voltage at a sense terminal is needed to overcome the deficiencies mentioned above.

According to the teachings of the present disclosure, an apparatus and method for filtering the transients of an input signal of an integrated circuit while maintaining a constant voltage at an input terminal of the integrated circuit are disclosed. In one example, the integrated circuit can be a controller of a switched-mode power supply. The controller can include a line sensing circuit coupled to receive an input signal representative of the line voltage and, in response, to produce an output signal that can be used by other circuits within the controller. More specifically, the input signal may include a current through a sense resistor that is coupled between the input of the power supply and the line sensing circuit. The output signal may include a scaled and filtered version of this current. In one embodiment, the line sensing circuit can be coupled to the input terminal of the controller to receive the input signal. In an alternative embodiment, the line sensing circuit can directly receive the input signal.

FIG. 1 illustrates an example power supply 100, also referred to as a power converter, with a controller 138 that includes a line sensing circuit 136 in accordance with the teachings of the present disclosure. In the illustrated example, power supply 100 receives an input voltage $V_{IN}$ 102, also referred to as a line voltage, to produce an output voltage $V_O$ 120 and an output current $I_O$ 118 to a load. In one example, input voltage $V_{IN}$ 102 is a rectified and filtered ac voltage. Input voltage $V_{IN}$ 102 is positive with respect to a primary ground 104 (also referred to as an input return) and output voltage $V_O$ 120 is positive with respect to a secondary ground 122 (also referred to as an output return). In other examples, power supply 100 may have more than one output.

Power supply 100 of FIG. 1 includes an energy transfer element $T_1$ 124 and a switch $S_1$ 150. Switch $S_1$ 150 represents the operation of a controlled semiconductor device, such as, for example, a metal oxide semiconductor field effect transistor (MOSFET) or a bipolar junction transistor (BJT). As further shown, controller 138 of power supply 100 receives a current sense signal 135, a feedback signal $U_{FB}$ 154, and an input sense signal $I_{IN}$ 162. Controller 138 may be implemented as a monolithic integrated circuit, with discrete electrical components, or a combination of discrete and integrated components. Controller 138 and switch $S_1$ 150 can form part of an integrated control circuit that is manufactured as either a hybrid or a monolithic integrated circuit.

In the illustrated example, energy transfer element T1 124 may be a coupled inductor or a transformer. Energy transfer element T1 124 is illustrated with two windings and provides galvanic isolation between the input and the output of power supply 100. Galvanic isolation prevents dc current between the input and the output of the power supply. In other words, a dc voltage applied between an input terminal and an output terminal of power supply 100 will produce little to no dc current between the input terminal and the output terminal of power supply 100. Winding 110 is a primary winding that has one end coupled to input voltage $V_{IN}$ 102 and the opposite end coupled to switch $S_1$ 150, which is shown in the example as coupled to input return 104. Winding 112 is a secondary winding that has one end coupled to output return 122 and the opposite end coupled to a rectifier $D_1$ 114. In the example power supply 100, rectifier $D_1$ 114 includes a diode, but in an alternative embodiment, rectifier $D_1$ 114 can include a switch used as a synchronous rectifier. The polarities of the windings, indicated by the dots at one end of each winding (dotted ends have the same polarity), show that power supply 100 is configured to be a flyback power supply. However, it is appreciated that other known topologies and configurations of switched mode power supplies may also benefit from the teachings of the present disclosure.

In operation of example power supply 100, controller 138 produces a drive signal $U_D$ 148 that may open and close switch $S_1$ 150 within repetitive switching periods $T_{SW}$. When switch $S_1$ 150 is closed (also referred to as being ON or being in an ON state), switch $S_1$ 150 may conduct current $I_P$ 134 in the primary winding 110 of energy transfer element 124. When switch $S_1$ 150 is open (also referred to as being OFF or being in an OFF state), switch $S_1$ 150 cannot conduct current. When switch $S_1$ 150 is ON, a voltage $V_P$ 108 across the primary winding 110 of energy transfer element 124 becomes substantially equal to input voltage $V_{IN}$ 102. While switch $S_1$ 150 remains in the ON state, primary current $I_P$ 134 increases linearly until it reaches a current limit $I_{LIM}$ 132 which, in one example, is a fixed limit. During this time, there is substantially no current in secondary winding 112 and coupled inductor $T_1$ 124 stores energy in primary winding 110.

In the example power supply 100, when primary current $I_P$ 134 reaches current limit $I_{LIM}$ 132, controller 138 opens switch $S_1$ 150. Subsequently, the energy stored from the primary winding 110 while switch $S_1$ 150 was conducting begins to transfer to secondary winding 112. This energy transfer produces pulsating current in secondary winding 112, which is in turn rectified by rectifier $D_1$ 114 and filtered by capacitor $C_1$ 116 to produce a substantially constant output voltage $V_O$ 120, output current $I_O$ 118, or a combination of the two at a load. A clamp circuit 106 is typically coupled across primary winding 110 to limit the voltage on switch $S_1$ 150 when switch $S_1$ 150 opens.

In one example, controller 138 senses primary current $I_P$ 134, which is also the current in switch $S_1$ 150, as a current sense signal 135. Any known means to sense current, such as, for example, receiving the voltage across a resistor conducting the current, receiving a scaled current from a current transformer, or receiving the voltage across the on-resistance of a MOSFET that conducts the current, may be used to sense primary current $I_P$ 134 and to provide current sense signal 135 to controller 138. The waveform of current sense signal 135 illustrated in FIG. 1 shows that power supply 100 is operating in the discontinuous conduction mode (DCM), which is typical for operation at light loads. A distinguishing characteristic of operation in DCM is that primary current $I_P$ 134 is substantially zero shortly after switch $S_1$ 150 turns ON. At higher loads, the power supply typically operates in the continuous conduction mode (CCM), which is distinguished by a jump in primary current $I_P$ 134 from substantially zero to a finite positive value shortly after switch $S_1$ 150 turns ON (not shown in FIG. 1).

In addition, power supply 100 further includes circuitry to regulate the output, which is represented by output quantity $U_O$ 156, to a desired value. Output quantity $U_O$ 156 can include output voltage $V_O$ 120 and/or output current $I_O$ 118. A sense circuit 152 is coupled to sense output quantity $U_O$ 156 from the output of power supply 100 and further coupled to provide feedback signal $U_{FB}$ 154 to controller 138.

As further illustrated in FIG. 1, controller 138 includes a control circuit 140 that receives a filtered input sense signal $I_{LINE}$ 164, feedback signal $U_{FB}$ 154, and current sense signal 135 and produces a drive signal $U_D$ 148 to control the switching of switch $S_1$ 150. As shown, control circuit 140 may include various analog and digital circuits, such as, for example, counters 142, logic gates 144, pulse width modulator (PWM) (not shown), and oscillators 146, to provide the desired relationships among filtered input sense signal $I_{LINE}$ 164, feedback signal $U_{FB}$ 154, current sense signal 135, and drive signal $U_D$ 148. In one example, control circuit 140 can use filtered input sense signal $I_{LINE}$ 164 to identify an under-voltage/overvoltage condition at the input of power supply 100 and to adjust drive signal $U_D$ 148 accordingly. In another example, control circuit 140 can adjust the duty ratio of the drive signal $U_D$ 148 in response to filtered input sense signal $I_{LINE}$ 164. Controller 138 also includes line sensing circuit 136 coupled to sense input voltage $V_{IN}$ 102 by receiving input sense signal $I_{IN}$ 162 that is representative of input voltage $V_{IN}$ 102. In one example, input sense signal $I_{IN}$ 162 includes a current in a sense resistor $R_{SEN}$ 160 that is coupled between line sensing circuit 136 and the input of power supply 100. It should be noted that other known means to sense voltage, such as, for example, receiving a scaled voltage from a transformer can be used. In operation, line sensing circuit 136 generates filtered input sense signal $I_{LINE}$ 164 by filtering and scaling input sense signal $I_{IN}$ 162 and provides filtered input sense signal $I_{LINE}$ 164 to control circuit 140.

In one example, control circuit 140 adjusts the value of the variable current limit $I_{LIM}$ 132 in response to feedback signal $U_{FB}$ 154 so that the output quantity $U_O$ 156 is regulated at a desired value. When the duration of switching period $T_{SW}$ is fixed, adjustment of the variable current limit $I_{LIM}$ 132 changes the duration that the switch $S_1$ 150 is ON, sometimes referred to as the on-time. The duration that the switch $S_1$ 150 is ON is also sometimes referred to as the on-time interval of the cycle. This type of control may be described as peak current PWM with fixed frequency. It is sometimes referred to as fixed frequency peak current mode control or just current mode control.

In other examples, the control circuit 140 may directly adjust the time that the switch $S_1$ 150 is ON within a fixed switching period when the primary current $I_P$ 134 is less than a fixed current limit. This type of control is sometimes referred to as fixed frequency voltage mode PWM, or fixed frequency duty ratio control.

In yet other examples, the control circuit 140 may fix the on-time of the switch when the primary current $I_P$ 134 is less than a fixed current limit and may adjust a variable switching period to regulate the output quantity. Alternatively, control circuit 140 may set a fixed current limit to turn the switch $S_1$ 150 OFF, and may adjust a variable switching period to regulate the output quantity.

In yet another example, the control circuit 140 may employ an on/off control technique that regulates the output quantity by enabling/disabling the conduction of switch $S_1$ 150 within a particular switching period. When enabled, switch $S_1$ 150 may conduct current in a switching period $T_{SW}$. When disabled, switch $S_1$ 150 may not conduct current for the entire duration of the switching period $T_{SW}$. Specifically, control circuit 140 decides whether to enable or disable the conduction of switch $S_1$ 150 for each switching period in response to feedback signal $U_{FB}$ 154 at the end of the previous switching period. In addition, control circuit 140 can adjust the variable current limit $I_{LIM}$ 132 of switch S1 150 to control the energy delivered to the output in each switching period $T_{SW}$.

Figure 2:
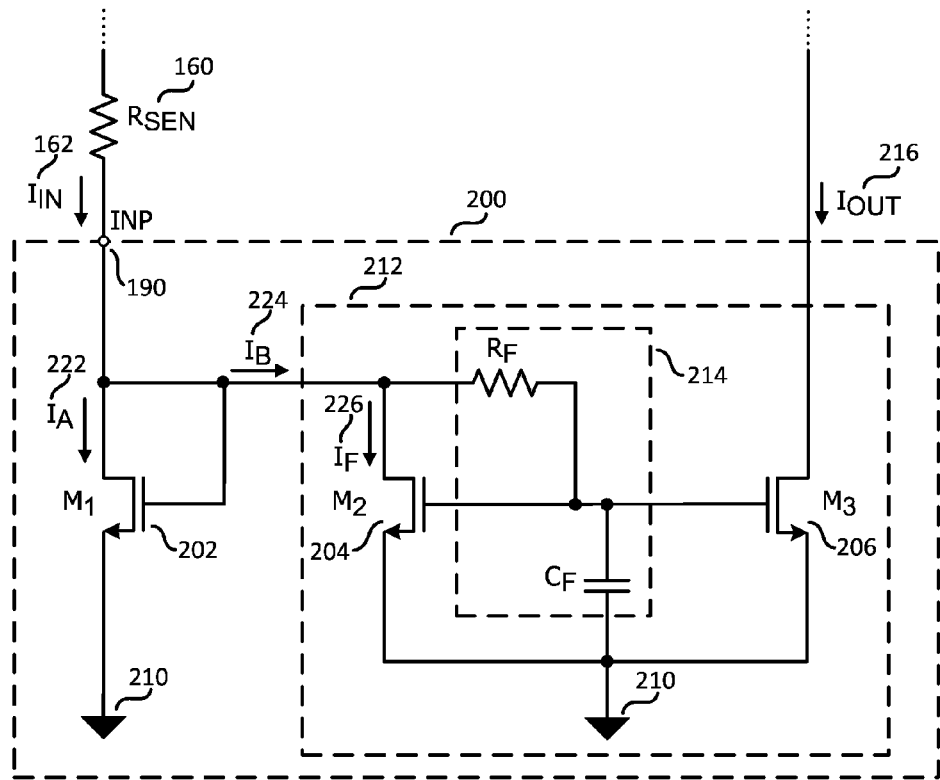
FIG. 2 is a circuit diagram illustrating an example split current mirror circuit that can be used as the line sensing circuit in accordance with the teachings of the present disclosure.

FIG. 2 shows a circuit diagram illustrating one example of a split current mirror circuit 200 that can be used as line sensing circuit 136 in controller 138 in accordance with the teachings of the present disclosure. Split current mirror circuit 200 includes a transistor $M_1$ 202 whose third terminal is coupled to a ground terminal 210 and whose second terminal and first terminal are coupled together at an input terminal INP 190 of split current mirror circuit 200. In the example of split current mirror circuit 200, ground terminal 210 represents a reference voltage or potential against which all other voltages or potentials of split current mirror circuit 200 are defined or measured. In one example, ground terminal 210 can be same as input return 104 but in another example, ground terminal 210 can be different from input return 104. In the illustrated example, input terminal INP 190 is coupled to an input terminal of controller 138, also referred to as a line sense terminal LSEN (not shown in FIG. 2), to receive input sense signal $I_{IN}$ 162. In another embodiment, controller 138 can also be configured in a different way such that input terminal INP 190 can also become line sense terminal LSEN of controller 138 and thus, can directly receive input sense signal $I_{IN}$ 162. As shown in FIG. 2, transistor $M_1$ 202 receives a first current signal $I_A$ 222, also referred to as a first portion of input sense signal $I_{IN}$ 162.

It is further illustrated in FIG. 2 that split current mirror circuit 200 includes a current mirror 212, comprising transistors $M_2$ 204 and $M_3$ 206, coupled to input terminal INP 190 to receive a second current signal $I_B$ 224, also referred to as a second portion of input sense signal $I_{IN}$ 162, and to produce an output signal $I_{OUT}$ 216 which, in the example split current mirror circuit 200, is a filtered and scaled input sense signal $I_{IN}$ 162. In one example, output signal $I_{OUT}$ 216 corresponds to filtered input sense signal $U_{LINE}$ 164 of controller 138.

Continuing with the example split current mirror circuit 200 of FIG. 2, the first terminal of transistor $M_2$ 204 is coupled to the first terminal of transistor $M_1$ 202 (i.e., to input sense terminal INP 190) and the first terminal of transistor $M_3$ 206 is coupled to the output of split current mirror circuit 200. As further shown, third terminals of transistors $M_2$ 204 and $M_3$ 206 are coupled to ground terminal 210 and the second terminals of transistors $M_2$ 204 and $M_3$ 206 are coupled together. In one embodiment, transistors $M_1$ 202, $M_2$ 204, and $M_3$ 206 are n-channel MOSFET devices; the third terminals of transistors $M_1$ 202, $M_2$ 204, and $M_3$ 206 correspond to source terminals of n-channel MOSFETs, the second terminals of transistors $M_1$ 202, $M_2$ 204, and $M_3$ 206 correspond to gate terminals of the n-channel MOSFETs, and the first terminals of transistors $M_1$ 202, $M_2$ 204, and $M_3$ 206 correspond to drain terminals of the n-channel MOSFETs. It should be noted, however, that other known device structures, such as, for example, BJT, insulated gate field effect transistor (IGBT), and transistor types, such as, for example, p-channel MOSFET, with appropriate modifications in the circuit configuration can be used in alternative embodiments according to the teachings of the present disclosure.

In operation, transistor $M_1$ 202 presents to input terminal INP 190 an impedance (from hereon referred to as a drain-to-source impedance of transistor $M_1$ 202) that can be mathematically expressed as $1/g_m$, where $g_m$ represents the transconductance of transistor $M_1$ 202. This number typically translates into an impedance that may vary between 200 Ohms and 5 kOhms depending on various MOSFET parameters, such as aspect ratio (i.e., the ratio of the width of a transistor to the length of the transistor), gate to source voltage, etc. Sense resistor $R_{SEN}$ 160, which is shown to be coupled to input terminal INP 190 in FIG. 2, however, is typically chosen in the range of 1 MOhms and 10 MOhms. In one embodiment, sense resistor $R_{SEN}$ 160 is chosen as 10 MOhms and thus, is much greater than the drain-to-source impedance of transistor $M_1$ 202. Moreover, the drain-to-source impedance of transistor $M_1$ 202 is typically substantially smaller than the impedance that current mirror 212 presents to input terminal INP 190 in parallel with the drain-to-source impedance of transistor $M_1$ 202. Therefore, the equivalent impedance looking into input terminal INP 190 is substantially equal to the drain-to-source impedance of transistor $M_1$ 202 and is much smaller than the impedance of sense resistor $R_{SEN}$ 160. As such, transistor $M_1$ 202 operates to absorb the transients in input sense signal $I_{IN}$ 162, thereby maintaining a constant or near constant voltage at input terminal INP 190 of split current mirror circuit 200 (and hence, at line sense terminal LSEN of controller 138). To illustrate, in one example, sense resistor $R_{SEN}$ 160 is chosen to be 10

MOhms and the aspect ratio of transistor $M_1$ 202 is adjusted in a way such that the resulting input sense signal $I_{IN}$ 162 is 100 μA and drain-to-source impedance of transistor $M_1$ 202 is 500 Ohms. Therefore, in this example, any transient in input sense signal $I_{IN}$ 162 that is 100 μA or less in magnitude will cause a maximum voltage difference of 50 mV at input terminal INP 190 which, for the example controller 138, is within the tolerance range.

In the example split current mirror circuit 200, current mirror 212 also includes a filter circuit 214 having an input terminal coupled to the first terminal of transistor $M_2$ 204 and an output terminal coupled to the second terminals of transistors $M_2$ 204, $M_3$ 206 to filter the transients in second current signal $I_B$ 224. In one embodiment, filter circuit 214 comprises a resistor $R_F$ coupled between the first terminal of transistor $M_2$ 204 and the second terminals of transistors $M_2$ 204, $M_3$ 206 and a capacitor $C_F$ coupled between the second terminals of transistors $M_2$ 204, $M_3$ 206 and ground terminal 210. The values of the resistor $R_F$ and the capacitor $C_F$ determine certain characteristics of filter circuit 214, such as, for example, cut-off frequency. In the illustrated example, filter circuit 214 is specifically configured such that the magnitude of any input signal that is at the cut-off frequency or at a higher frequency is reduced by an attenuation rate, the rate at which magnitude of input signal is reduced by filter circuit 214, of at least 50%. It should be noted that filter circuit 214 can be configured differently with different components and different component values to produce greater attenuation rates for input signals that are at the cut-off frequency or above.

As further illustrated in FIG. 2, filtered current signal $I_F$ 226 is reflected through transistor $M_3$ 206 of current mirror 212 to generate output signal $I_{OUT}$ 216. In the example split current mirror circuit 200, the aspect ratio of transistor $M_3$ 206 is one fifth of the aspect ratio of transistor $M_2$ 204. Thus, current mirror 212 not only reflects filtered current signal $I_F$ 226 through transistor $M_3$ 206, but also scales filtered current signal $I_F$ 226 by the ratio of W/L of transistor $M_3$ 206 to W/L of transistor $M_2$ 204, as indicated by the steady state value $I_3$ of output signal $I_{OUT}$ 216, which is one fifth of the steady state value $I_2$ of filtered current signal $I_F$ 226. However, it should be appreciated that other aspect ratios can be used.

Figure 3:
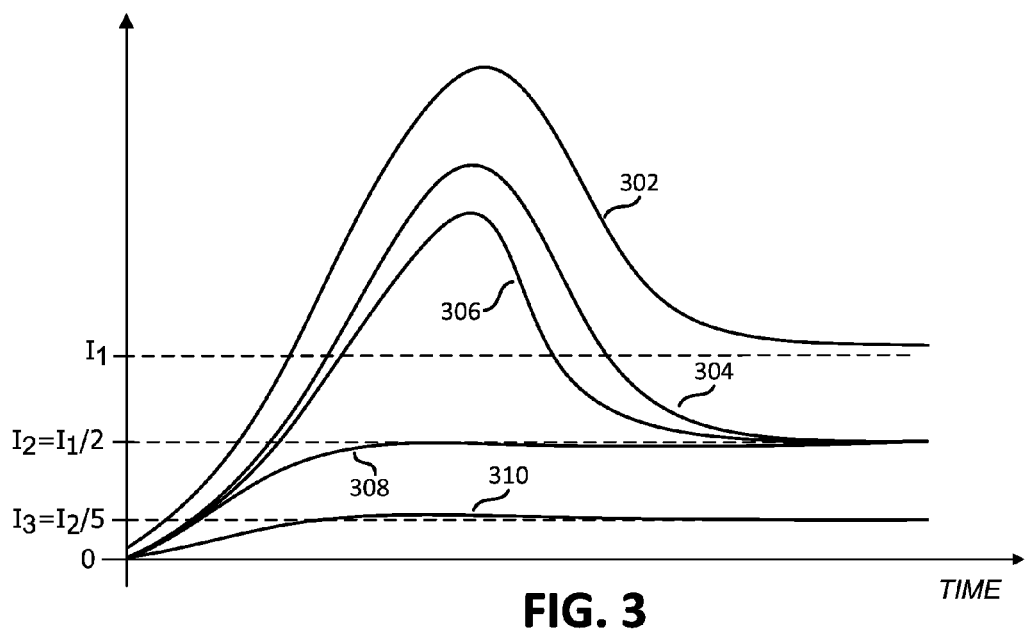
FIG. 3 is a timing diagram showing example waveforms for various signals that are associated with the split current mirror circuit of FIG. 2 in accordance with the teachings of the present disclosure.

FIG. 3 is a timing diagram showing example waveforms for various signals that are associated with split current mirror circuit 200 of FIG. 2 in accordance with the teachings of the present disclosure. Waveform 302 is one possible representation of input sense signal $I_{IN}$ 162. As shown, input sense signal $I_{IN}$ 162 has a transient portion where the signal first increases quickly and then comes down before settling at a value $I_1$. Waveform 304 is one possible representation of first current signal $I_A$ 222 and waveform 306 is one possible representation of second current signal $I_B$ 224. As illustrated in FIG. 2, input sense signal $I_{IN}$ 162 splits into first current signal $I_A$ 222 and second current signal $I_B$ 224 upon reaching the input terminal INP 190. In the example split current mirror circuit 200, transistors $M_1$ 202 and $M_2$ 204 are matched devices with equal aspect ratios (i.e., the ratio of the width of a transistor to the length of the transistor), also referred to as W/L, and the gate of transistor $M_2$ 204 is coupled to the gate of transistor $M_1$ 202 through resistor $R_F$. Therefore, when input sense signal $I_{IN}$ 162 reaches steady state (or equivalently, when filter circuit 214 stops conducting current), the gate to source voltage of transistor $M_1$ 202 becomes equal to the gate to source voltage of transistor $M_2$ 204 as there is no voltage drop across resistor $R_F$, making the steady state value of first current signal $I_A$ 222 substantially equal to the steady state value of second current signal $I_B$ 224 at a value $I_2$. In other words, input sense signal $I_{IN}$ 162, in steady state, is split equally between first current signal $I_A$ 222 and second current signal $I_B$ 224. As illustrated in FIG. 3, the transient portion of input sense signal $I_{IN}$ 162, however, is not split equally between first current signal $I_A$ 222 and second current signal $I_B$ 224. This is partially due to the impedance looking into the drain of transistor $M_1$ 202 (the drain-to-source impedance of transistor $M_1$ 202) being less than the combined impedance that transistor $M_2$ 204 and filter circuit 214 present to input terminal INP 190. As a result, when input sense signal $I_{IN}$ 162 splits between first current signal $I_A$ 222 and second current signal $I_B$ 224, first current signal $I_A$ 222 takes a greater share of the transient portion of input sense signal $I_{IN}$ 162. Therefore, the transient portion of first current signal $I_A$ 222 is more pronounced than the transient portion of second current signal $I_B$ 224.

Figure 4:
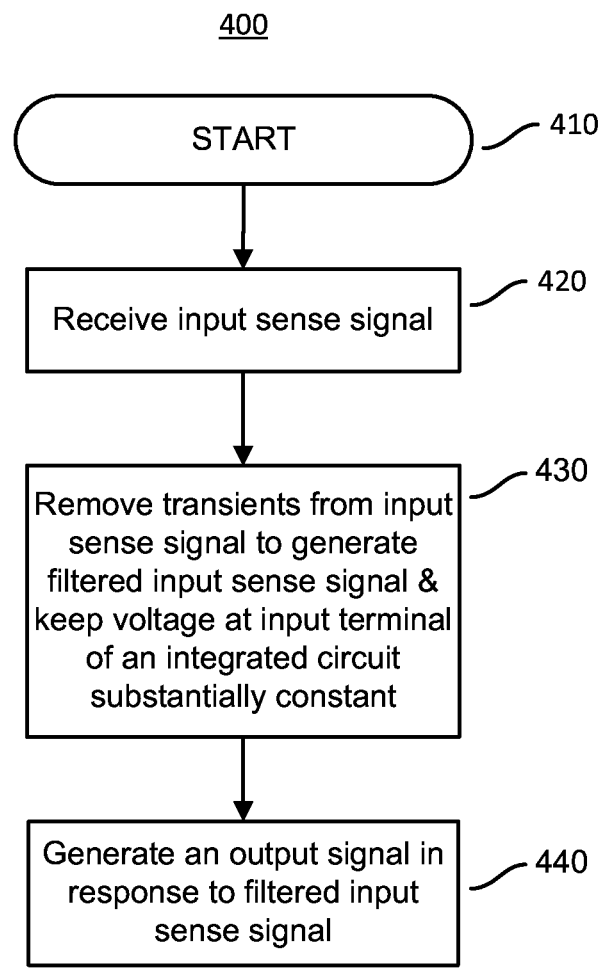
FIG. 4 is a flow diagram illustrating an example method for generating an output signal that has substantially reduced transients at an output of an integrated circuit and at the same time, for maintaining a substantially constant voltage at an input terminal of the integrated circuit in accordance with the teachings of the present disclosure.

As further shown in FIG. 3, waveform 308 is one possible representation of a filtered current signal $I_F$ 226 in transistor $M_2$ 204 and waveform 310 is one possible representation of output signal $I_{OUT}$ 216. In operation, filter circuit 214 substantially removes the transients in second current signal $I_B$ 224 received by current mirror 212, resulting in filtered current signal $I_F$ 226 in transistor $M_2$ 204 that has substantially reduced transients. In the example split current mirror circuit 200, the cut-off frequency of filter circuit 214 can be determined according to the following expression:

$$f_C = \frac{1}{R_F C_F}$$

and the values of the resistor $R_F$ and the capacitor $C_F$ are chosen in a way to set the cut-off frequency of filter circuit 214 to 1 MHz. Therefore, any transient in second current signal $I_B$ 224 that is faster than 1 MHz will be reduced by at least 50% in magnitude. FIG. 4 is a flow diagram illustrating a method 400 for generating an output signal that has reduced transients at an output of an integrated circuit while keeping a substantially constant voltage at an input terminal of the integrated circuit, such as split current mirror circuit 200 in accordance with the teachings of the present disclosure. The method begins at block 410. For example, split current mirror circuit 200 may start to operate. At block 420, an input sense signal can be received. For example, split current mirror circuit 200 may receive an input sense signal, which in one example is representative of an input voltage of a switched mode power supply, such as power supply 100. Next, at block 430, transient portions of the input sense signal are removed to generate a filtered input sense signal while maintaining a substantially constant voltage at the input terminal. For example, current mirror 212 including filter circuit 214 can be coupled to the input terminal to generate the filtered input sense signal by filtering transient portions of the input sense signal and transistor $M_1$ 202, with its gate and drain coupled together at the input terminal, can be used to maintain a substantially constant voltage at the input terminal. At block 440, an output signal having reduced transients is generated at the output of the integrated circuit by reflecting the filtered input sense signal to the output of the integrated circuit with a current mirror, such as current mirror 212. In one example, the output signal corresponds to a scaled and filtered input sense signal.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller for regulating a power converter, the controller comprising:
   a line sensing circuit coupled to receive an input sense signal representative of an input voltage to the power converter, the line sensing circuit comprising:
      a first transistor coupled to receive a first portion of the input sense signal; and
      a current mirror coupled to receive a second portion of the input sense signal and output a filtered input sense signal; and
   a control circuit coupled to receive the filtered input sense signal.

2. The controller of claim 1, wherein the current mirror comprises:
   a second transistor; and
   a third transistor coupled to the second transistor as a current mirror, wherein the third transistor is further coupled to output the filtered input sense signal.

3. The controller of claim 2, wherein a second terminal of the first transistor is coupled to a first terminal of the first transistor.

4. The controller of claim 3, wherein the second terminal and the first terminal of the first transistor are coupled to a first terminal of the second transistor.

5. The controller of claim 4, wherein a second terminal of the second transistor is coupled to a second terminal of the third transistor.

6. The controller of claim 5, wherein the current mirror further comprises a resistor coupled between the first terminal of the second transistor and the second terminal of the second transistor and the second terminal of the third transistor.

7. The controller of claim 6, wherein the current mirror further comprises a capacitor coupled to the second terminal of the second transistor and the second terminal of the third transistor, and wherein:
   the second terminal of the first transistor comprises a gate of the first transistor;
   the first terminal of the first transistor comprises a drain of the first transistor;
   the first terminal of the second transistor comprises a drain of the second transistor;
   the second terminal of the second transistor comprises a gate of the second transistor; and
   the second terminal of the third transistor comprises a gate of the third transistor.

8. The controller of claim 2, wherein an aspect ratio of the first transistor is equal to an aspect ratio of the second transistor, and wherein an aspect ratio of the third transistor is less than the aspect ratio of the second transistor.

9. The controller of claim 1, wherein the control circuit is further coupled to:
   receive a feedback signal;
   receive a current sense signal; and
   generate a drive signal configured to switch a power switch between an ON state and an OFF state to regulate the output of the power converter based at least in part on the filtered input sense signal, the feedback signal, and the current sense signal.

10. The controller of claim 1, wherein the line sensing circuit is operable to reduce a transient portion of the input sense signal by at least 50%.

11. The controller of claim 1, wherein the line sensing circuit is operable to maintain a voltage of the input sense signal at a substantially constant value.

12. A power converter, comprising:
    a power switch; and
    a controller for regulating the power converter, the controller comprising:
       a line sensing circuit coupled to receive an input sense signal representative of an input voltage to the power converter, the line sensing circuit comprising:
          a first transistor coupled to receive a first portion of the input sense signal; and
          a current mirror coupled to receive a second portion of the input sense signal and output a filtered input sense signal; and
       a control circuit coupled to receive the filtered input sense signal, wherein the control circuit is configured to generate a drive signal configured to switch the power switch between an ON state and an OFF state to regulate the output of the power converter based at least in part on the filtered input sense signal.

13. The power converter of claim 12, wherein the current mirror comprises:
    a second transistor; and
    a third transistor coupled to the second transistor as a current mirror, wherein the third transistor is further coupled to output the filtered input sense signal.

14. The power converter of claim 13, wherein a second terminal of the first transistor is coupled to a first terminal of the first transistor.

15. The power converter of claim 14, wherein the second terminal and the first terminal of the first transistor are coupled to a first terminal of the second transistor.

16. The power converter of claim 15, wherein a second terminal of the second transistor is coupled to a second terminal of the third transistor.

17. The power converter of claim 16, wherein the current mirror further comprises a resistor coupled between the first terminal of the second transistor and the second terminal of the second transistor and the second terminal of the third transistor.

18. The power converter of claim 17, wherein the current mirror further comprises a capacitor coupled to the second terminal of the second transistor and the second terminal of the third transistor, and wherein:
    the second terminal of the first transistor comprises a gate of the first transistor;
    the first terminal of the first transistor comprises a drain of the first transistor;
    the first terminal of the second transistor comprises a drain of the second transistor;
    the second terminal of the second transistor comprises a gate of the second transistor; and
    the second terminal of the third transistor comprises a gate of the third transistor.

19. The power converter of claim 13, wherein an aspect ratio of the first transistor is equal to an aspect ratio of the second transistor, and wherein an aspect ratio of the third transistor is less than the aspect ratio of the second transistor.

20. The power converter of claim 12, wherein the line sensing circuit is operable to reduce a transient portion of the input sense signal by at least 50%.

21. The power converter of claim 12, wherein the power converter is a flyback power converter.

22. The power converter of claim 12, wherein the line sensing circuit is operable to maintain a voltage of the input sense signal at a substantially constant value.

23. A method for filtering a sense signal in a power converter, the method comprising:
receiving an input sense signal representative of an input voltage to the power converter; and
filtering, by a line sensing circuit, a transient portion of the input sense signal to generate a filtered input sense signal, wherein the line sensing circuit comprises:
a first transistor coupled to receive a first portion of the input sense signal; and
a current mirror coupled to receive a second portion of the input sense signal and output the filtered input sense signal.

24. The method of claim 23, wherein the current mirror comprises:
a second transistor; and
a third transistor coupled to the second transistor as a current mirror, wherein the third transistor is further coupled to output the filtered input sense signal.

25. The method of claim 24, wherein a second terminal of the first transistor is coupled to a first terminal of the first transistor.

26. The method of claim 25, wherein the second terminal and the first terminal of the first transistor are coupled to a first terminal of the second transistor.

27. The method of claim 26, wherein a second terminal of the second transistor is coupled to a second terminal of the third transistor.

28. The method of claim 27, wherein the current mirror further comprises a resistor coupled between the first terminal of the second transistor and the second terminal of the second transistor and the second terminal of the third transistor.

29. The method of claim 28, wherein the current mirror further comprises a capacitor coupled to the second terminal of the second transistor and the second terminal of the third transistor, and wherein:

the second terminal of the first transistor comprises a gate of the first transistor;
the first terminal of the first transistor comprises a drain of the first transistor;
the first terminal of the second transistor comprises a drain of the second transistor;
the second terminal of the second transistor comprises a gate of the second transistor; and
the second terminal of the third transistor comprises a gate of the third transistor.

30. The method of claim 24, wherein an aspect ratio of the first transistor is equal to an aspect ratio of the second transistor, and wherein an aspect ratio of the third transistor is less than the aspect ratio of the second transistor.

31. The method of claim 23, wherein filtering the transient portion of the input sense signal to generate the filtered input sense signal comprises reducing the transient portion of the input sense signal by at least 50%.

32. The method of claim 23, wherein filtering the transient portion of the input sense signal to generate the filtered input sense signal comprises maintaining a voltage of the input sense signal at a substantially constant value.

33. A power converter, comprising:
a power switch;
a controller for regulating the power converter, the controller comprising:
a line sensing circuit coupled to receive an input sense signal representative of an input voltage to the power converter, the line sensing circuit comprising:
a first transistor coupled to receive a first portion of the input sense signal; and
a current mirror coupled to receive a second portion of the input sense signal and output a filtered input sense signal; and
a control circuit coupled to receive the filtered input sense signal, wherein the control circuit is configured to generate a drive signal configured to switch the power switch between an ON state and an OFF state to regulate the output of the power converter based at least in part on the filtered input sense signal; and
a sense resistor coupled between an input of the power converter and the first transistor, wherein an impedance of the sense resistor is between 1-10 MOhms, and wherein a drain-to-source impedance of the first transistor is between 200-5000 Ohms.

* * * * *